UNITED STATES PATENT OFFICE.

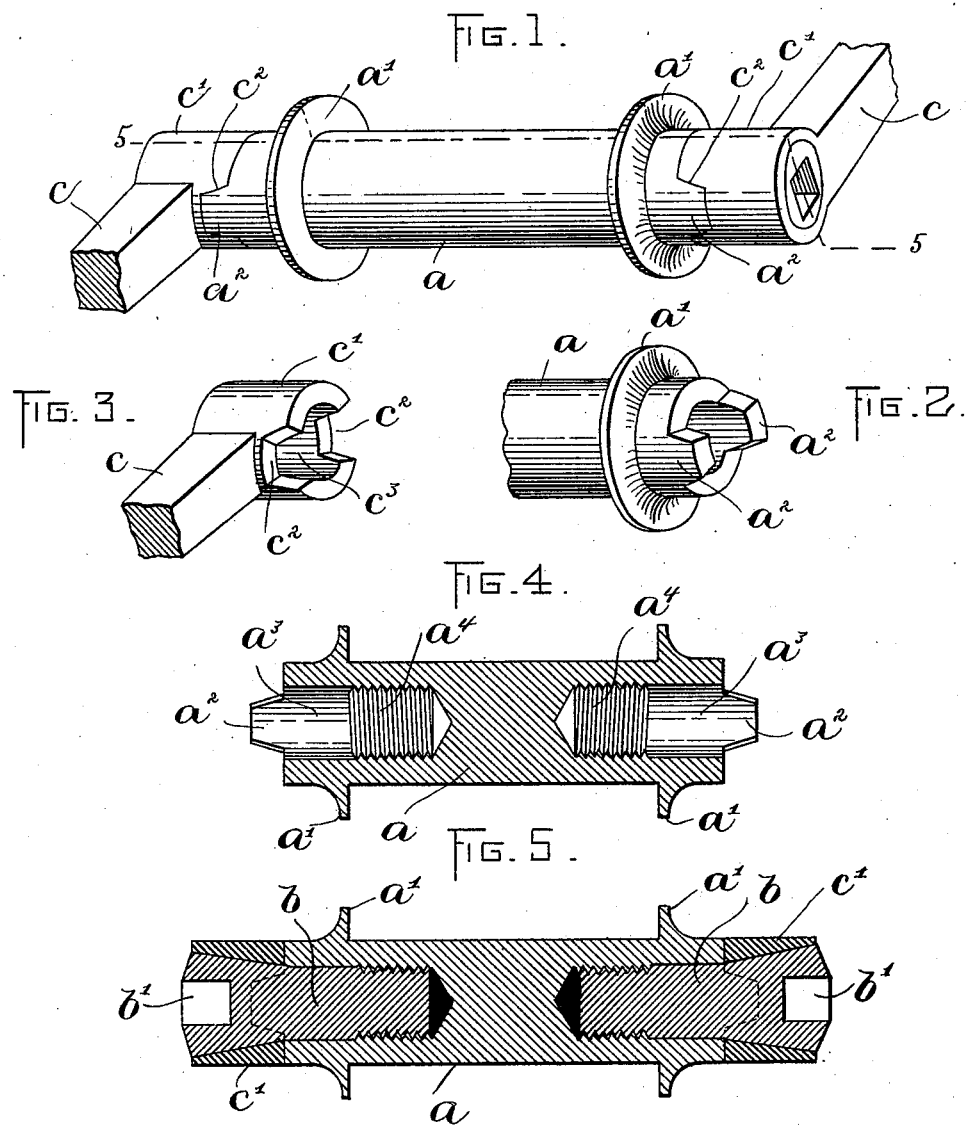

JOHN S. ALCORN, OF WALTHAM, MASSACHUSETTS, ASSIGNOR OF ONE-HALF TO B. A. GOODELL, OF SAME PLACE.

BICYCLE CRANK-SHAFT.

SPECIFICATION forming part of Letters Patent No. 590,695, dated September 28, 1897.

Application filed November 24, 1896. Serial No. 613,245. (No model.)

*To all whom it may concern:*

Be it known that I, JOHN S. ALCORN, of Waltham, in the county of Middlesex and State of Massachusetts, have invented certain new and useful Improvements in Bicycle Crank-Shafts, of which the following is a specification.

This invention has for its object to provide for a strong and secure detachable connection between the crank-shaft of a bicycle and the pedal-cranks.

The invention consists in a bicycle crank-shaft comprising a body portion having clutch members at its ends and bolt-receiving cavities extending inwardly therefrom, cranks made as separable parts and having clutch members formed to engage the clutch members of the body portion, and bolt-orifices arranged to coincide with the bolt-receiving cavities in the body portion, and independent bolts formed to enter said cavities and orifices, the said bolts and clutch members cooperating in securing the cranks to the body portion, and the hubs of the cranks being substantially flush with the ends of the body portion of the shaft.

Of the accompanying drawings, forming a part of this specification, Figure 1 represents a perspective view of a crank-axle embodying my invention. Fig. 2 represents a perspective view of one end of the body portion of the axle. Fig. 3 represents a perspective view of a portion of one of the cranks. Fig. 4 represents a longitudinal section of the body portion, the cranks being removed. Fig. 5 represents a section on line 5 5 of Fig. 1.

The same letters of reference indicate the same parts in all the figures.

In the drawings, $a$ represents the shaft proper or body portion of a bicycle crank-shaft, this being the part that rotates in a hanger or bearing forming a part of the bicycle-frame. The said body portion $a$ is provided with the usual cones or bearings $a'\ a'$, which run on balls interposed between them, and suitable cups in the hanger. Each end of the body portion $a$ is formed as a clutch member, preferably by being provided with two teeth or projections $a^2 a^2$ at opposite sides of the axis of the body. In the end portion of the body $a$ are formed longitudinal cavities $a^3\ a^3$ to receive the bolts $b\ b$, whereby the cranks are secured to the body portion, the inner portions of said cavities $a^3$ being provided with screw-threads $a^4\ a^4$.

Each of the crank-arms $c$ is provided with a hub $c'$, having an orifice $c^3$ formed to receive a bolt $b$, and formed at its inner end as a clutch member, the formation in this case being recesses $c^2\ c^2$, formed to receive the teeth $a^2\ a^2$ on the ends of the body portion $a$. The bolt-receiving orifices $c^3$ of the crank-arms are formed to coincide with the cavities $a^3$ of the body portion $a$, as shown in Fig. 5.

The bolts $b\ b$ are formed to fit the orifices $c^3$ in the crank-arms and the cavities $a^3$ in the body portion $a$, and are screw-threaded at their inner ends to engage the threads $a^4$ in said cavities. The bolts are here shown as tapered at their outer portions to fit the correspondingly-tapered walls of the orifices $c^3$ in the cranks, this tapering form enabling the bolts to secure the cranks against longitudinal displacement. I do not limit myself, however, to the tapering form of the bolts and orifices, as the bolts may have heads formed to enter countersunk enlargements in the cranks. The bolts are provided with squared sockets $b'$ in their outer ends to engage a wrench or other instrument used for rotating the bolts.

It will be seen that by the described construction I am enabled to securely attach each crank-arm to the body portion $a$ and to readily detach the same, each crank-arm being attached and removed independently of the other. The interlocking clutch members of the body portion and the cranks prevent independent rotation of the cranks and body portion, while the bolts prevent lateral or endwise movement of the cranks upon the body portion.

I am aware that it is not new to provide the ends of the body portion of a bicycle crank-shaft and the corresponding portions of the cranks with interlocking clutch members and to provide means for detachably holding the clutch members of the cranks in engagement with the clutch members of the body portion. I do not therefore claim, broadly, a crank-shaft comprising a body portion having clutch members, separable cranks having complemental clutch members, and means for detachably holding the clutch members of the cranks in engagement with the clutch members of the body portion.

I claim—

A bicycle crank-shaft comprising a body portion having longitudinal clutch members projecting from its ends, and bolt-receiving cavities extending inwardly therefrom, said cavities having internal screw-threads at their inner ends; separable cranks having clutch members formed to engage the clutch members of the body portion, and bolt-orifices arranged to coincide with the cavities of the body portion; and independent bolts having screw-threads at their inner ends engaging the internal threads of the cavities, and enlargements at their outer ends engaging the cranks, the hubs of the cranks being in alinement with the ends of the body portion so as to form a substantially flush external surface.

In testimony whereof I have signed my name to this specification, in the presence of two subscribing witnesses, this 5th day of November, A. D. 1896.

JOHN S. ALCORN.

Witnesses:
B. A. GOODELL,
C. F. BROWN.